United States Patent [19]
Hagino

[11] Patent Number: 5,839,832
[45] Date of Patent: Nov. 24, 1998

[54] WRAPPING DEVICE

[75] Inventor: Junichi Hagino, Toyonaka, Japan

[73] Assignee: Packs Co. Ltd., Osaka, Japan

[21] Appl. No.: 852,537

[22] Filed: May 7, 1997

Related U.S. Application Data

[62] Division of Ser. No. 363,376, Dec. 23, 1994, Pat. No. 5,655,842.

[30] Foreign Application Priority Data

| Dec. 28, 1993 | [JP] | Japan | 5-335696 |
| Sep. 14, 1994 | [JP] | Japan | 6-219903 |
| Oct. 24, 1994 | [JP] | Japan | 6-257981 |

[51] Int. Cl.⁶ .................................................. B65D 33/01
[52] U.S. Cl. ........................ 383/101; 383/103; 426/118
[58] Field of Search .......................... 383/101, 103, 383/100; 426/118; 220/366.1

[56] References Cited

U.S. PATENT DOCUMENTS

| 2,593,328 | 4/1952 | Meaker | 229/55 |
| 2,595,708 | 5/1952 | Salfisberg | 383/100 |
| 3,085,737 | 4/1963 | Horton | 229/55 |
| 3,494,457 | 2/1970 | Titchenal | 206/46 |
| 3,610,516 | 10/1971 | Esty | 383/103 |
| 3,628,720 | 12/1971 | Schmedding | 229/55 |
| 3,637,132 | 1/1972 | Gray | 383/103 |
| 3,937,396 | 2/1976 | Schneider | 383/103 |
| 4,470,153 | 9/1984 | Kenan | 383/100 |
| 4,550,441 | 10/1985 | Keppel | 383/103 |
| 4,550,546 | 11/1985 | Raley et al. | 53/425 |
| 4,874,620 | 10/1989 | Mendenhall et al. | 426/113 |
| 4,890,744 | 1/1990 | Lane, Jr. et al. | 383/100 |
| 5,399,022 | 3/1995 | Sheets | 383/103 |
| 5,417,123 | 5/1995 | D'Autry | 73/864 |
| 5,553,942 | 9/1996 | Domke | 383/101 |

FOREIGN PATENT DOCUMENTS

| 150137 | 2/1985 | Denmark | B65D 33/01 |
| 559598 | 8/1993 | European Pat. Off. | B65D 1/00 |
| 531176 | 10/1993 | European Pat. Off. | B65D 81/34 |
| 63-59838 | 4/1988 | Japan | B65D 33/01 |
| 63-67443 | 5/1988 | Japan | B65D 30/24 |
| 886612 | 1/1962 | United Kingdom . |
| 926198 | 5/1963 | United Kingdom . |
| 8807479 | 6/1988 | WIPO | B65D 30/24 |

*Primary Examiner*—Stephen P. Garbe
*Attorney, Agent, or Firm*—Fulbright & Jaworski, LLP

[57] ABSTRACT

A wrapping device having a laminate film is disclosed. The laminate film includes at least a pair of outer layer and inner layer comprising synthetic resin layers non-heat-fusible relative to each other, a bonded portion through which the outer layer and the inner layer are bonded to each other by bonding means and a non-bonded portion where the outer layer and the inner layer are separated from each other. A communicating passage is formed at the non-bonded portion by the inner and outer layers. A communicating construction is provided to the inner layer at the non-bonded portion, the construction allowing communication between space facing the inner layer and the communicating passage.

2 Claims, 15 Drawing Sheets

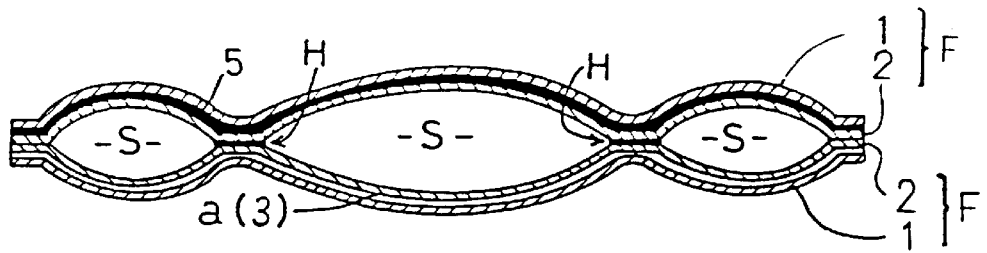
Fig. 27
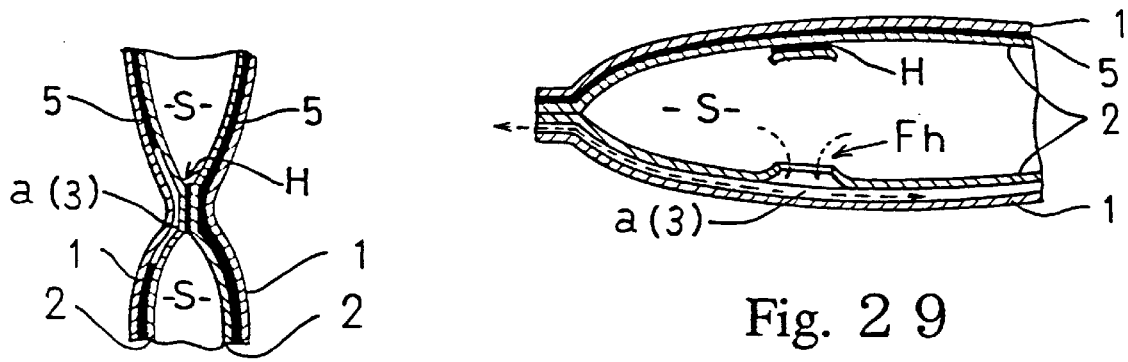
Fig. 28
Fig. 29
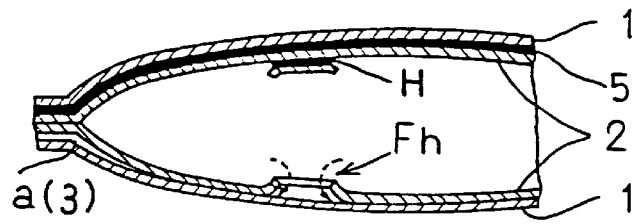
Fig. 30
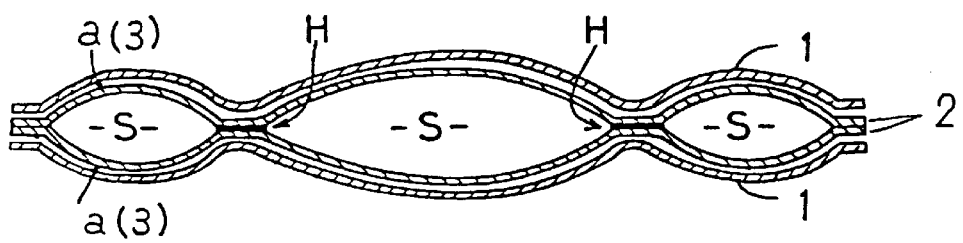
Fig. 31

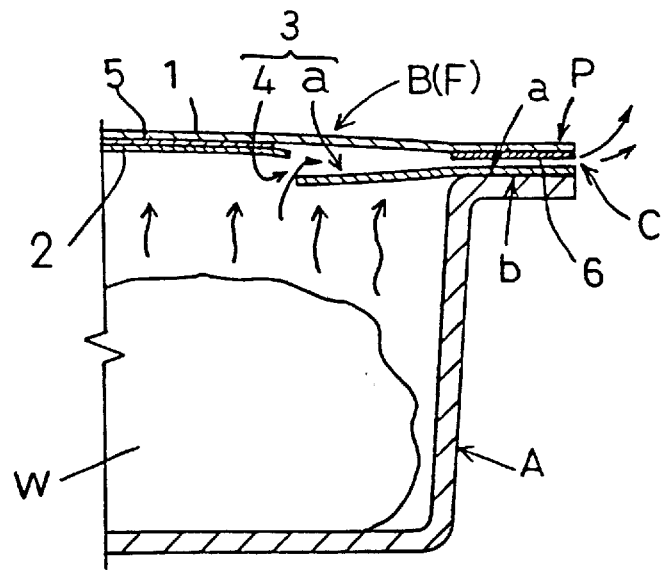
Fig. 35
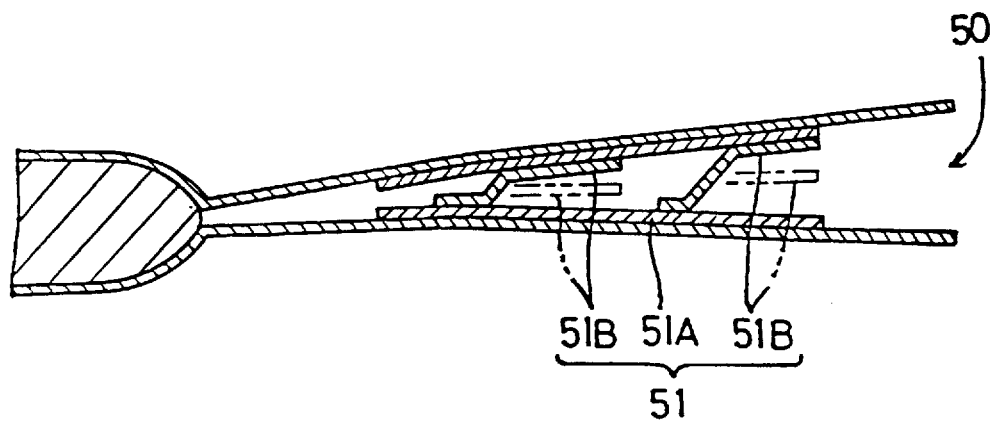
(PRIOR ART)   Fig. 36

WRAPPING DEVICE

This application is a divisional of Ser. No. 08/363,376 filed Dec. 23, 1994, now U.S. Pat. No. 5,655,847.

BACKGROUND OF THE INVENTION

1. Field of the Invention

The present invention relates to a wrapping device such as a wrapping bag or a wrapping container for housing an object, e.g. a food product, in a fluid-tight state, and more particularly to a wrapping device constructed of a laminate film formed by bonding of a plurality of synthetic resin sheet materials which are non-heat-fusible relative to each other.

2. Description of the Related Art

With a wrapping bag into which an object and a gas are introduced at one time, the bag may burst when subjected to an external force applied by e.g. vertical stacking of a plurality of bags. Further, the bag may burst also by vapor generated from the housed object when heated or vaporization of solid carbon dioxide housed within the bag together with the object for the purpose of its refrigeration. In this respect, a communicating hole may be formed in the laminate film forming the wrapping bag. However, with such simple arrangement alone, while the communicating hole may discharge the air initially housed within the bag or the gas or vapor generated after the sealing of the bag, there may occur other inconvenience such as invasion of foreign substance through the communicating hole or invasion of oxygen through the same which results in undesirable oxidation of the housed object.

Moreover, when the food product as being sealed within the container is heated in a microwave oven, vapor generated from the product in association with the heating increases the gas pressure inside the container, and this increased gas pressure may burst open the laminate film acting as a cover or even the container body, so that the product may be destroyed and scattered inside the oven. In order to avoid this problem, it has been suggested to break open, before heating, a part or whole of the heat-fused portion between the container body and the cover or cut an opening in the laminate film so as to communicate the inside of the container with the ambience to allow escape of the vapor generated from the food product due to its heating. However, this method makes the heat cooking more troublesome. Also, if the user forgets to form such opening before heating and the food product as remained sealed within the container is heated, this will result in the burst of the cover or the container body.

Then, in order to prevent such inconvenience, the prior art has suggested use of an anti-reverse valve 51 as shown in FIG. 36 (e.g. Japanese laid-open utility model gazette No. 63-67443, Japanese laid-open utility model gazette No. 63-59838). This wrapping bag has its peripheral edges heat-sealed with leaving open an entrance opening 50. The anti-reverse valve 51 is inserted into the entrance opening 50 and then heat-fused to the same. The anti-reverse valve 51 consists of a planar tube portion 51A formed of a synthetic film and a film piece 51B also formed of the synthetic material. One end of the film piece 51B is bonded to one of opposing inner faces of the tube portion 51A and the other end of the film piece 51B is placed in close contact with the other inner face of the tube portion 51A. With this, a communicating passage is formed between the inner face of the tube portion 51A and the other end of the film piece 51B, to allow fluid inside the bag to be discharged to the outside.

However, the above-described conventional wrapping bag requires the anti-reverse valve 51 made of a synthetic resin film, in addition to the bag body. Moreover, the manufacturing process of this bag requires the step of heat-fusing the anti-reverse valve 51 to the entrance opening 50 with inserting and fixedly maintaining the former at a predetermined position of the latter. For this reason, it becomes difficult to effect the above-described heat-fusing step while charging the object into the bag in a continuous manner. Thus, the mechanism for automatic wrapping operation tends to be complicated, thereby to add to the production costs as a whole.

Furthermore, since the attaching position of the anti-reverse valve 51 is limited to the entrance opening 50 of the bag, the construction tends to impose undesirable restrictions on the designs of the shape of the bag.

The present invention attends to the above-described state of the art, and its primary object is to provide an improved wrapping device such as a bag or a container which may normally maintain good fluid-tight condition while allowing smooth discharging of the inner fluid or gas to the outside when necessary. The container device may also effectively resist invasion of e.g. germs if the device should be opened during its transportation or storage. The container also allows greater designing freedom in e.g. the discharging position of the fluid and the shape of the bag. And, this bag may be automatically manufactured at low costs.

SUMMARY OF THE INVENTION

In order to fulfill the above-noted object, a wrapping device, according to the present invention, comprises:

a laminate film including, at least a pair of outer layer and inner layer comprising synthetic resin layers non-heat-fusible relative to each other, a bonded portion through which the outer layer and the inner layer are bonded to each other; and a non-bonded portion where the outer layer and the inner layer are separated from each other, a communicating passage formed at the non-bonded portion by said outer layer and inner layer; and at least one aperture provided to in the inner layer at the non-bonded portion, aperture communicating with the inner layer with said communicating passage.

In manufacturing the above-described wrapping device as a wrapping bag, the peripheral portions of the bag body are sealed by a heat-fusing process in a direction trasversing the non-bonded portion. In such case, since this non-bonded portion is formed of the non-heat-fusible laminate film, the heat-fusing process does not block the communicating passage. Thus, a predetermined communicating passage may be reliably provided whatever position of the bag body the non-bonded portion may be provided.

For discharging the fluid in the bag to the outside through the communicating passage, a communicating outlet opening is formed, by a predetermined process, in the synthetic resin layer of the bag corresponding to the non-bonded portion and facing the inner space thereof. This communicating opening is for communicating between the communicating passage and the interior outside of the bag. In operation, when the inner pressure of the bag builds up due to an external factor such as the ambient temperature or an external pressure, the communicating opening automatically breaks open to allow the fluid inside the bag to escape through this communicating opening and the communicating passage to the outside.

On the other hand, under a normal situation when the inner pressure of the bag is lower than a predetermined level, the communicating opening and the non-bonded portion forming the communicating passage are maintained under the fluid-tight sealed condition, thereby to maintain the interior of the bag under the fluid-tight condition. That is to say, if the communicating passage should break open e.g. during shipping of the bag, the bag may effectively resist invasion of e.g. germs due to its highly gas-tight condition.

Further, since the communicating opening for communication between the communicating passage and the ambience is formed in the laminate film per se, unlike the conventional art, the construction of the invention does not require the anti-reverse valve made of a synthetic resin film. Further, as the construction also does not require the manufacturing step of attaching such anti-reverse valve to the entrance opening, the wrapping bag having both the degassing function and the gas-sealing function may be readily manufactured by an automatic wrapping system at low costs. Moreover, since the fluid discharging position may be freely set according to a particular shape of the wrapping bag, the construction provides greater freedom in designing a wrapping bag.

In addition, the process of forming the communicating opening may be readily effected in the manufacturing process of the laminate film, and a desired communicating passage may be readily provided only with appropriate consideration about non-applying portion of an adhesive agent. Thus, this wrapping device may be manufactured only with simple modification of the existing system and at low manufacture costs.

The foregoing and other objects and features of the present invention will be further understood from the following detailed discussion thereof and from the accompanying drawings.

BRIEF DESCRIPTION OF THE DRAWINGS

The accompanying drawings illustrate preferred embodiments of a laminate film and a wrapping device such as a wrapping bag or wrapping container all relating to the present invention; in which, FIG. 22 is a perspective view of a three-side-sealed type wrapping bag, FIG. 23 is a perspective view of a stand-sealed type wrapping bag, FIG. 27 is a plane view in section showing the wrapping bag before inner layer films break open, FIG. 28 is a side view in vertical section showing the wrapping bag before the inner layer films break open, FIG. 29 is a plane view in section showing the wrapping bag at its fluid discharging condition after the inner layer films have broken open, FIG. 30 is a plane view in section showing the wrapping bag at its fluid-tight condition after the inner layer films have broken open, FIG. 31 is a plane view in section showing a wrapping bag having communicating passages at two side faces thereof, FIG. 35 is a section view showing a wrapping container at its discharging condition, the container having a communicating passage at a portion of its cover, and FIG. 36 is a section view showing major portions of a conventional wrapping bag.

DETAILED DESCRIPTION OF THE PREFERRED EMBODIMENTS

Preferred embodiments of the present invention relating to a laminate film and wrapping bag and container using the film will be discussed in details with reference to the accompanying drawings.

(Embodiments Relating to a Laminate Film)

Figure 1:
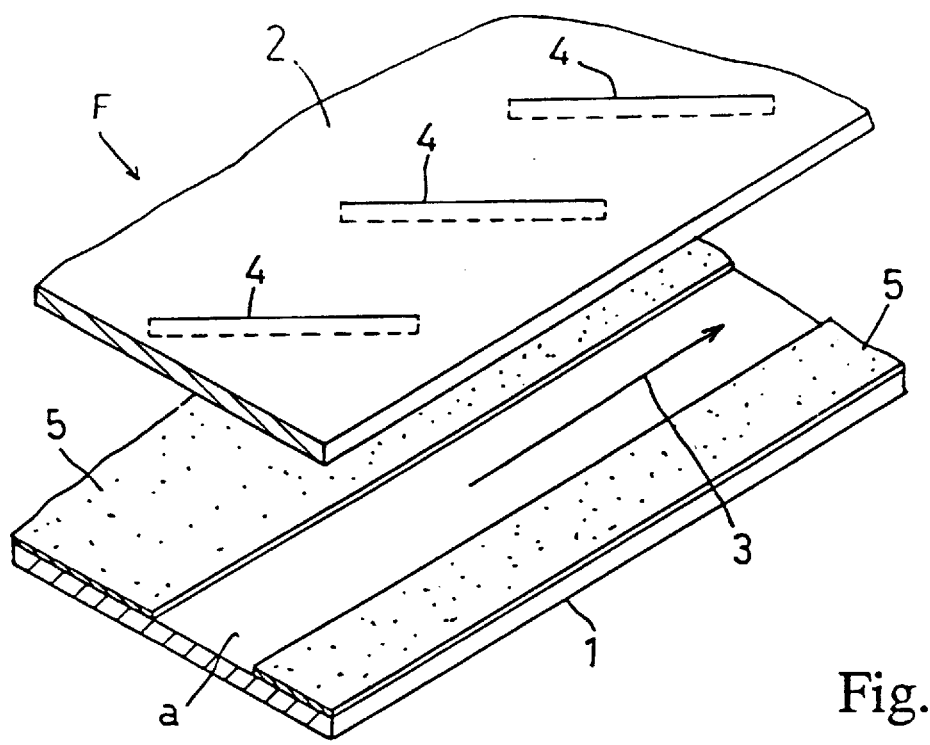
FIG. 1 is an exploded perspective view of a laminate film.

As shown in FIG. 1, a laminate film F according to the present invention comprises a two-layer construction including an outer nylon layer and an inner polyethylene layer which layers are non-heat-fusible to each other.

More particularly, the base nylon film 1 and the base polyethylene film 2 are laid one on the other by the dry laminating method and then these films are bonded together by means of an adhesive agent 5.

Between the two base films 1 and 2 forming the laminate film F, a non-bonded region free from the application of the adhesive agent 5 is provided in a form of an elongate band at an area of the rectangular base film 1 adjacent and along one edge thereof. This non-bonded region provides a non-bonded portion (a) capable of providing a communicating passage 3. In correspondence with this non-bonded portion (a), a plurality of communicating openings 4 are defined in the polyethylene film 2. These openings 4 are provided as a plurality of cuts disposed with a predetermined pitch therebetween. With these, the space facing the nylon base film 2 and the communicating passage 3 are communicated with each other.

Figure 2:
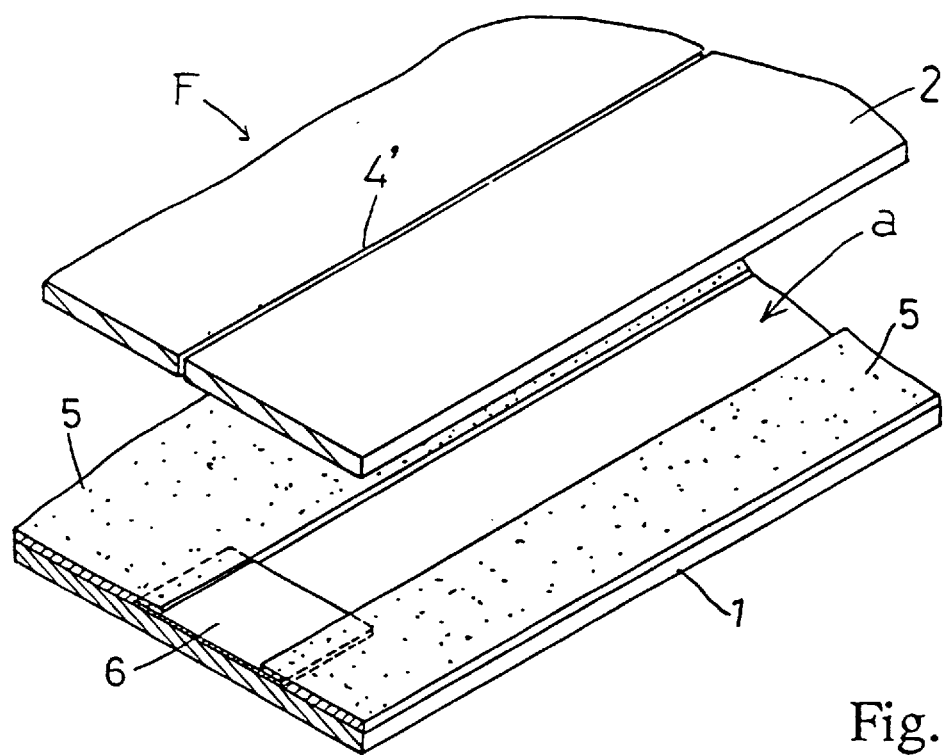
FIG. 2 is a further exploded perspective view of the laminate film.

Incidentally, the communication openings 4 may be replaced by a single long streak-like cut 4' extending along the longitudinal direction of the non-bonded portion (a), as shown in FIG. 2.

Figure 3:
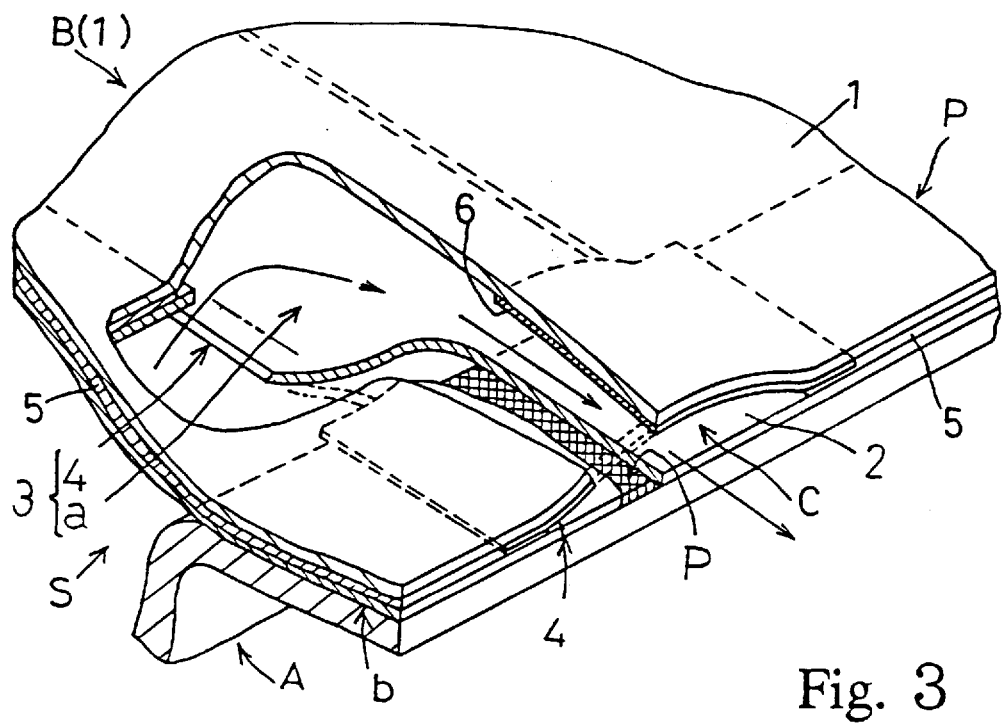
FIG. 3 is a partially cutaway perspective view showing a fluid discharging condition of a communicating passage.

Further, as shown in FIG. 3, in the face of the base film 1 corresponding to the non-bonded portion (a), at a portion thereof corresponding to an outlet opening C of the communicating passage 3, a peelable adhesive layer 6 may be formed.

Figure 4:
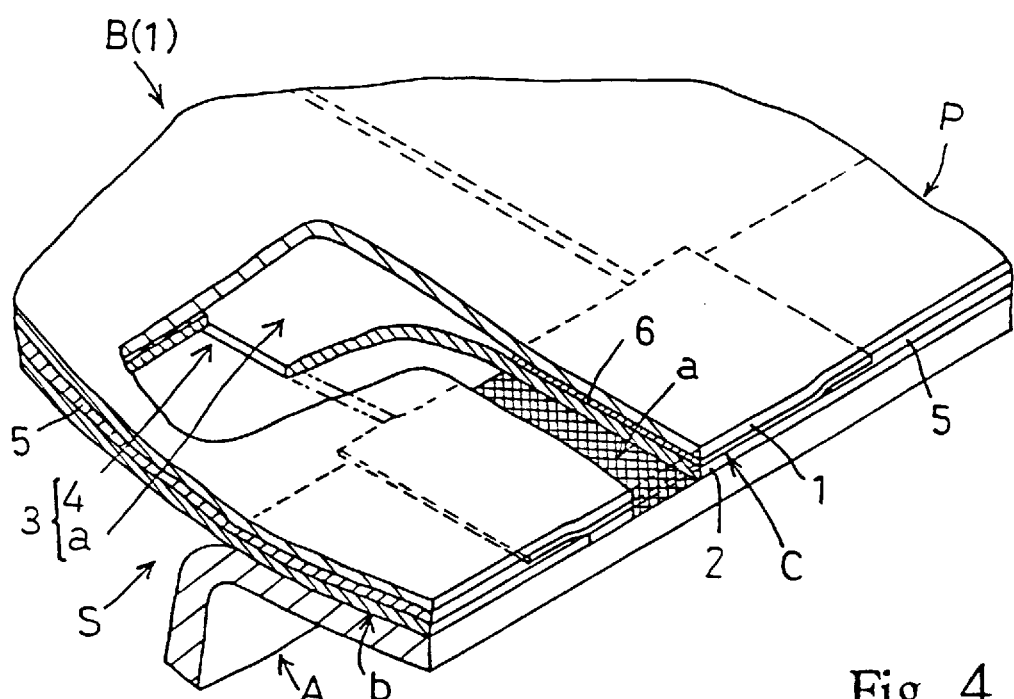
FIG. 4 is a partially cutaway perspective view showing a fluid-tight condition of the communicating passage.

As a result, by the adhesive force of the adhesive layer 6, the base film 1 and the base film 2 become adhered to each other. Then, under a low or normal temperature condition, the space facing the base film 2 and the space outside the outlet opening C are not in communication with each other, as illustrated in FIG. 4. On the other hand, when the pressure of the gas filling the space facing the base film 2 exceeds the adhesive force of the adhesive layer 6, as illustrated in FIG. 3, the base film 1 and the base film 2 becomes detached from each other to break open the outlet opening C. This represents the unsealed state, wherein the communicating passage 3 communicates with the space outside opening C. Thereafter, when the pressure difference between the inside and outside of the laminate film F is equal, the outlet opening C becomes sealed again as shown in FIG. 4.

Next, a sample method of manufacturing the laminate film F by the dry laminating method will be described.

Figure 5:
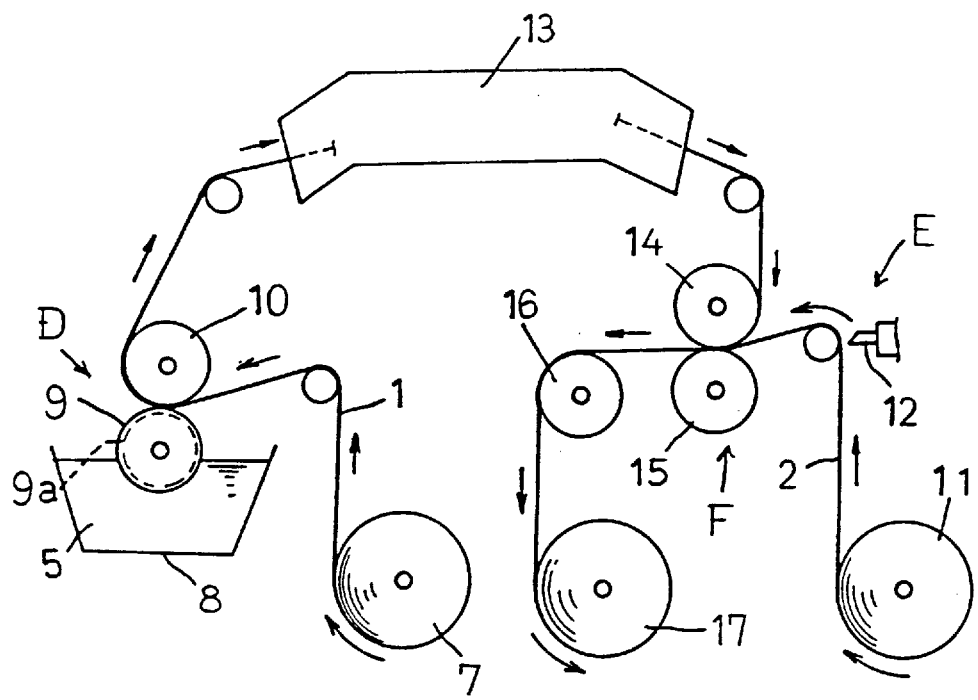
FIG. 5 is a schematic view illustrating a process of manufacturing the laminate film by a dry laminating method.
Figure 6:
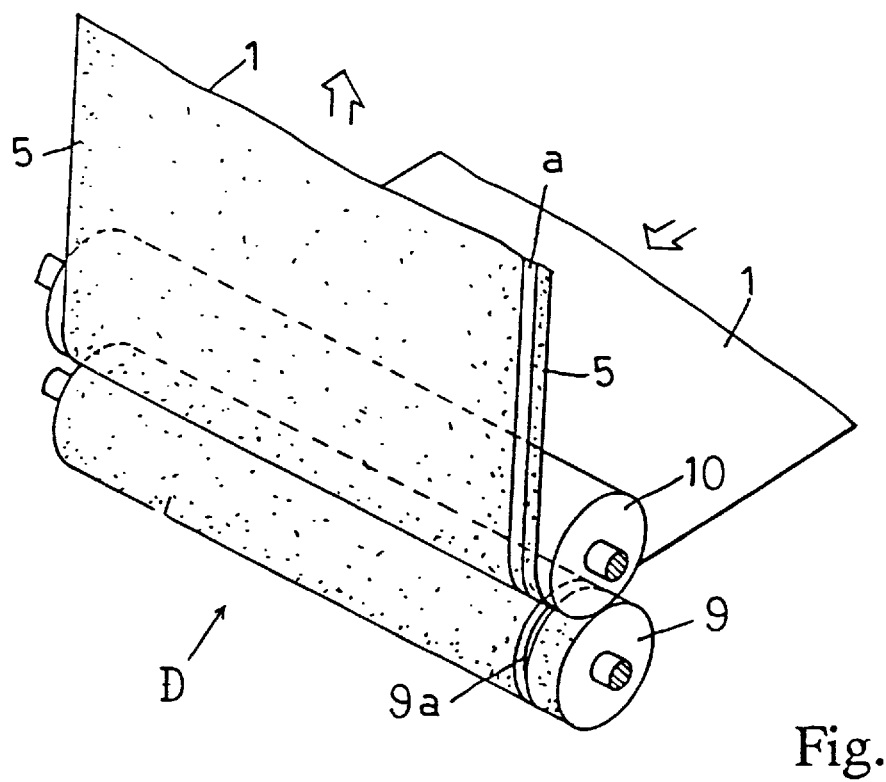
FIG. 6 is a perspective view illustrating a step of applying an adhesive agent at a coating section.
Figure 7:
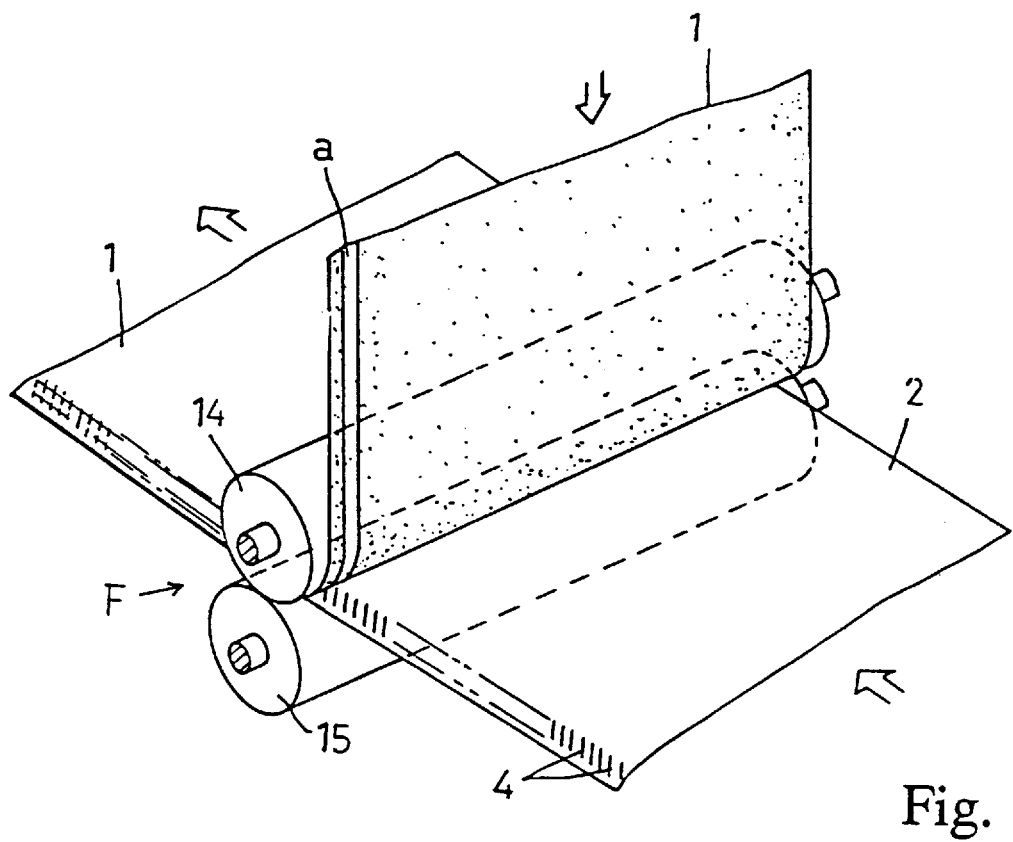
FIG. 7 is a perspective view illustrating a bonding step the coating section.

As shown in FIGS. 5 through 7, the nylon base film 1 fed from a first roll 7 is guided to a coating section D, in which the adhesive agent 5 is applied to one side of the nylon base film 1 by means of a coating roll 9 and a rubber roll 10 submerged in the liquid adhesive agent 6 in a tank 8.

In the course of the above, on the outer peripheral face of the coating roll 9 and at a portion thereof corresponding to the non-bonded portion (a), an annular groove 9a having the same width as the communicating passage 3 is formed, so that the film portion corresponding to this annular groove 9a is free from the application of the adhesive agent 5.

On the other hand, the polyethylene base film 2 fed from a second roll 11 is guided to a cutting section E, where the plurality of communicating openings 4 or the single elongated communicating opening 4' is cut by means of a rotary cutter 12 at the film portion corresponding to the non-bonded portion.

Thereafter, the nylon base film 1 fed from the coating section D via a drying furnace 13 and the polyethylene base film 2 fed from the cutting section E are guided to a laminating section F, where these base films 1 and 2 are bonded together by a heating metal roll 14 and a rubber roller 15 and then cooled by a cooling roll 16. This manufactured laminate film F is retrieved about a third roll 17.

Figure 8:
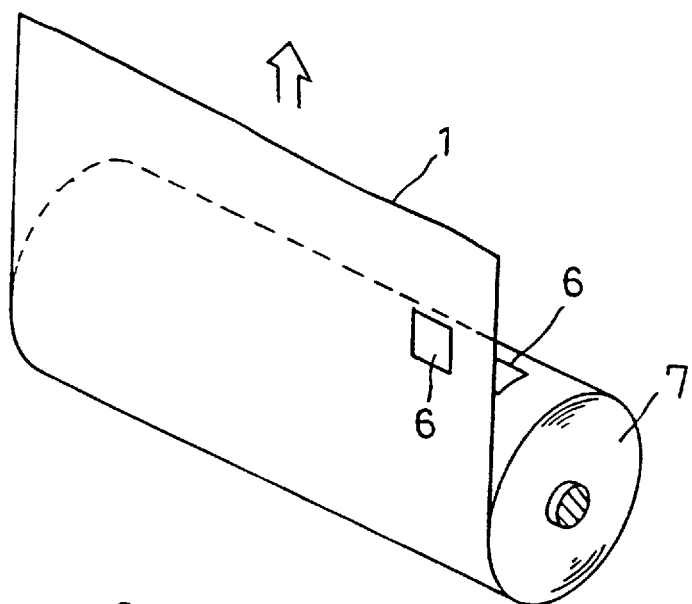
FIG. 8 is a perspective view showing a condition when a base film having an adhesive layer is fed from a first roll.
Figure 9:
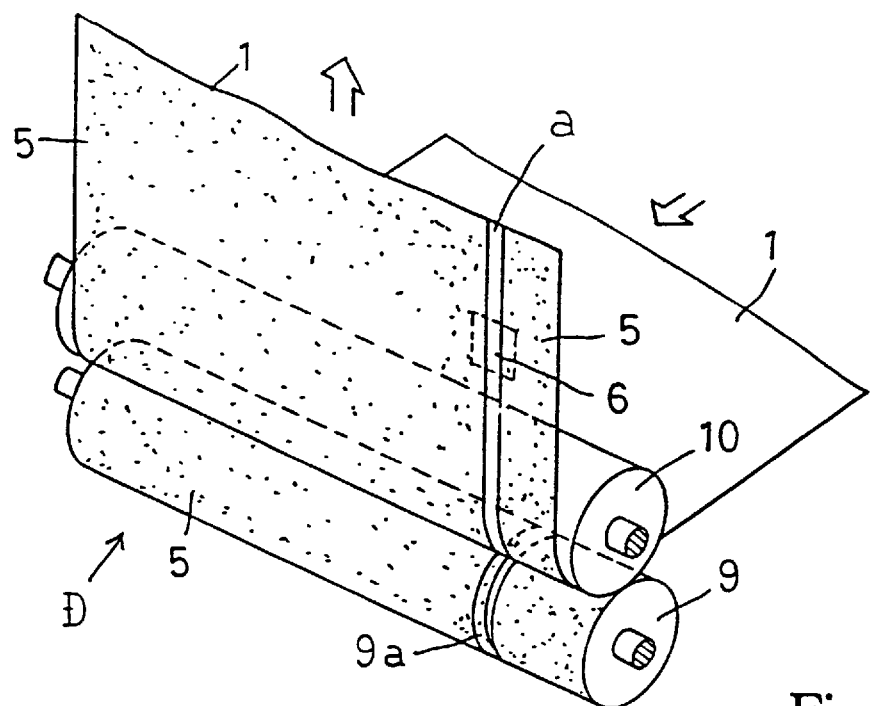
FIG. 9 is a perspective view illustrating a step of applying the adhesive agent at the coating section.
Figure 10:
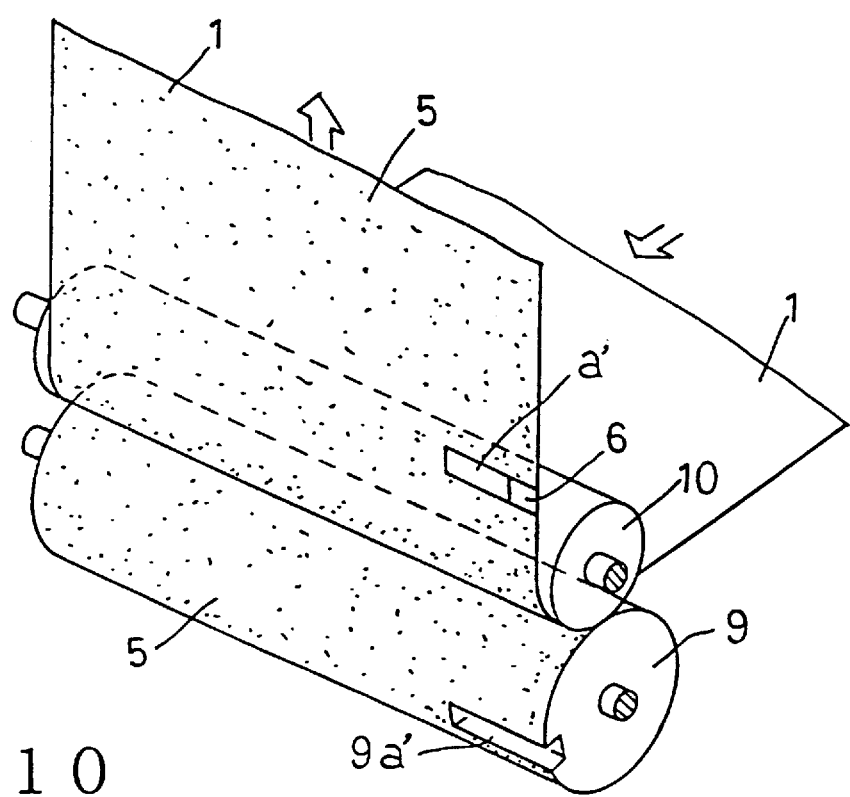
FIG. 10 is a perspective view illustrating a step of applying the adhesive agent at the coating section.

As shown in FIGS. 8, 9 and 10, of the face corresponding to the non-bonded portion (a), the laminate film F is cut in advance as a cover member B as shown in FIG. 3. In this condition, the nylon base film 1 applied with the adhesive layer 6 at the portion thereof corresponding to the outlet opening C has already been wound about the first roll 7. Then, the base film 1 fed from this first roll 7 is guided to the coating section D, in which the adhesive agent 5 is applied to one side face of the film 1 by means of the coating roll 9 and the rubber roll 10 submerged in the liquid adhesive agent 5 in the tank 8.

The adhesive agent 5 may be a urethane resin, polyvinyl acetate resin, natural rubber or the like. And, such material is dissolved in an organic solvent for use as the agent.

In place of the above-described manufacturing method, the annular groove 9a may be provided in form of a straight linear groove extending along the width direction of the outer peripheral face of the coating roll 9. In this case, by varying the diameter of the coating roll 9, the forming distance of the non-bonded portion (a) may be conveniently varied.

Incidentally, in FIGS. 8, 9 and 10, the non-bonded portion (a) free from the application of the adhesive agent 5 is provided only at the single portion along the film width direction. Instead, a plurality of non-bonded portions (a) may be formed along the film width direction so as to manufacture a plurality of films at one time.

In the foregoing discussion, there is disclosed the method of the laminate film F having the non-bonded portion (a). Instead, it is also possible to cut the other portion of this film not having the non-bonded portion (a). Further, in order to manufacture such film having no non-bonded portion (a), the laminate film F may be produced by using a coating roll 9 not having the annular groove 9a.

Figure 11:
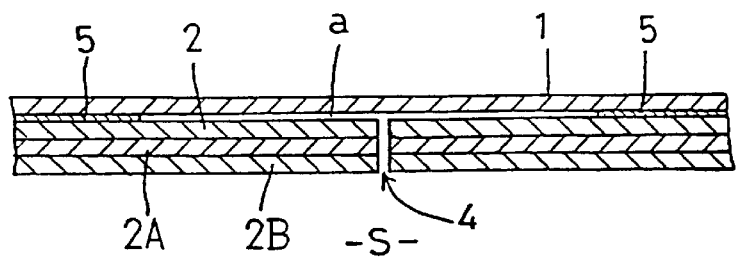
FIG. 11 is an enlarged section view of a laminate film comprised of a plurality of synthetic resin layers.

Further, the construction of the laminate film F is not limited to the two-layer construction described above. Instead, as shown in FIG. 11, the laminate film F may be comprised of four synthetic resin layers 1, 2, 2A, 2B. In this case, if the outermost synthetic resin layer 1 and the adjacent layer 2 are formed of the non-heat-fusible synthetic resin material, the non-bonded portion (a) capable of providing the communicating passage 3 for communication with the outside is formed between the outermost resin layer 1 and the adjacent resin layer 2. Whereas, the communicating opening 4 for the communication between the communicating passage 3 and the bag inner space S may be formed in the other synthetic resin layers 2, 2A, 2B on the side of the bag inner space S corresponding to said non-bonded portion (a).

The synthetic resin material forming the film may be conveniently selected from other materials, than the nylon and polyethylene, such as polypropylene, polyester or the like.

In the foregoing, the laminate film F is manufactured by the dry laminating method. The manufacturing method of the same is not limited thereto. For instance, the wet laminating method, extrusion laminating method, hot-melt laminating method, co-extrusion laminating method or the like may be employed instead.

Next, various embodiments using the laminate film F will be discussed.

(First Embodiment Relating to a Wrapping Bag)

Figure 12:
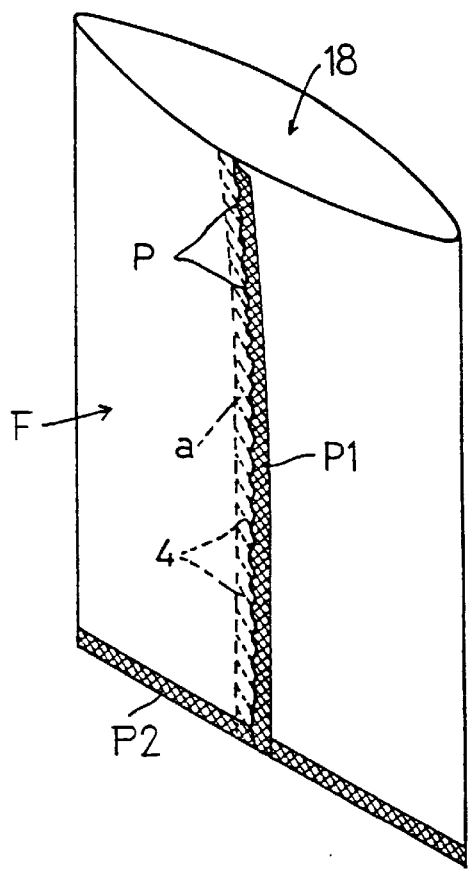
FIG. 12 is a perspective view showing a wrapping bag before an object is introduced therein.

As shown in FIG. 12, the laminate film F is double-folded into a form of flat cylindrical shape, with the polyethylene base film 2 being positioned on the inside. A first fusing portion P1 of the side extending along the axis of the cylinder and a second fusing portion P2 of the further side forming the bottom of the bag are heat-fused, respectively. Next, after an object W to be wrapped is introduced through one non-heat-fused entrance opening 18, a third fusing portion P3 of the side forming the opening 18 will be heat-fused to be sealed.

Figure 13:
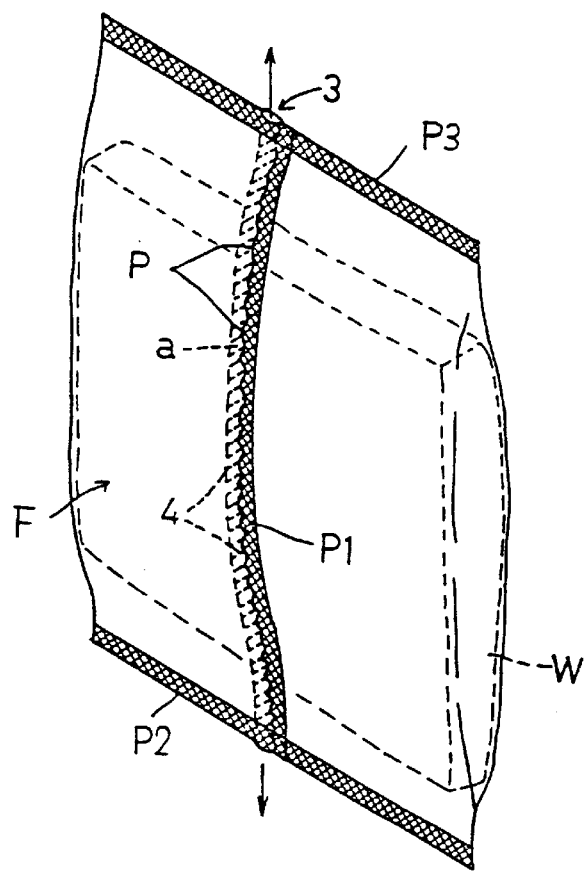
FIG. 13 is a perspective view of the wrapping bag after the introduction of the object.
Figure 14:
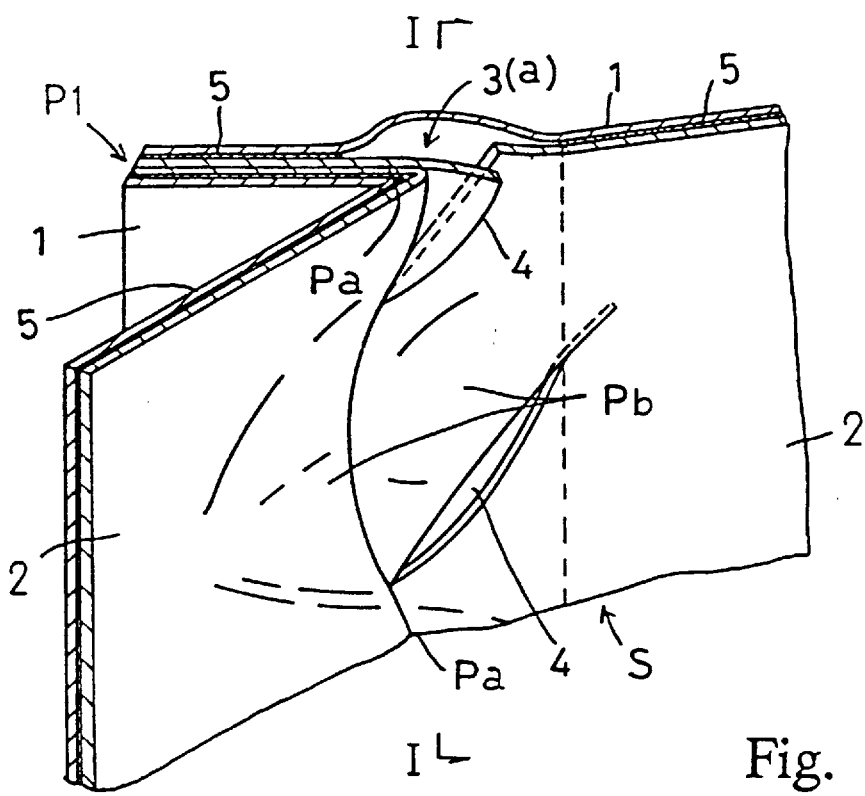
FIG. 14 is a perspective view showing a fluid discharging condition of a communicating passage of the wrapping bag at a portion corresponding to a groove portion of a corrugated heat-fused portion.
Figure 15:
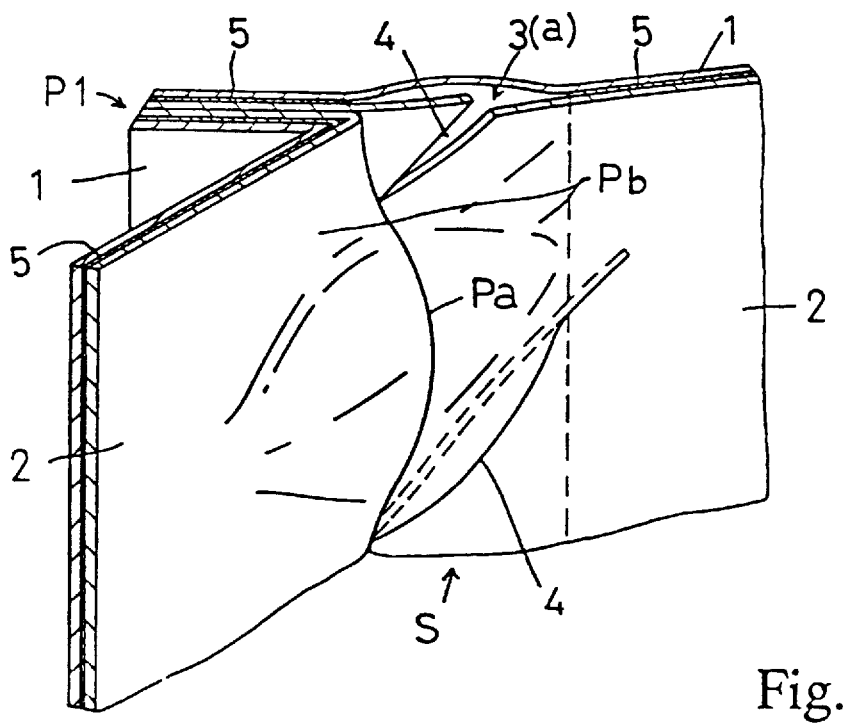
FIG. 15 is a perspective view showing a fluid discharging condition of the communicating passage of the wrapping bag at a further portion corresponding to a ridge portion of the corrugated heat-fused portion.
Figure 16:
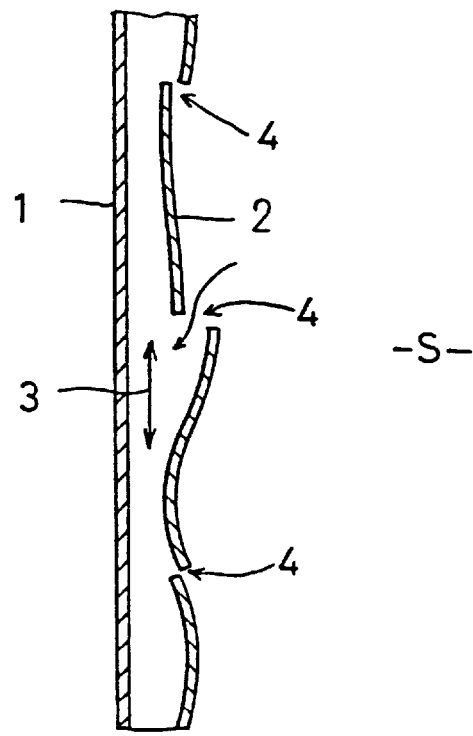
FIG. 16 is a section view taken along a line I—I in FIG. 14.
Figure 17:
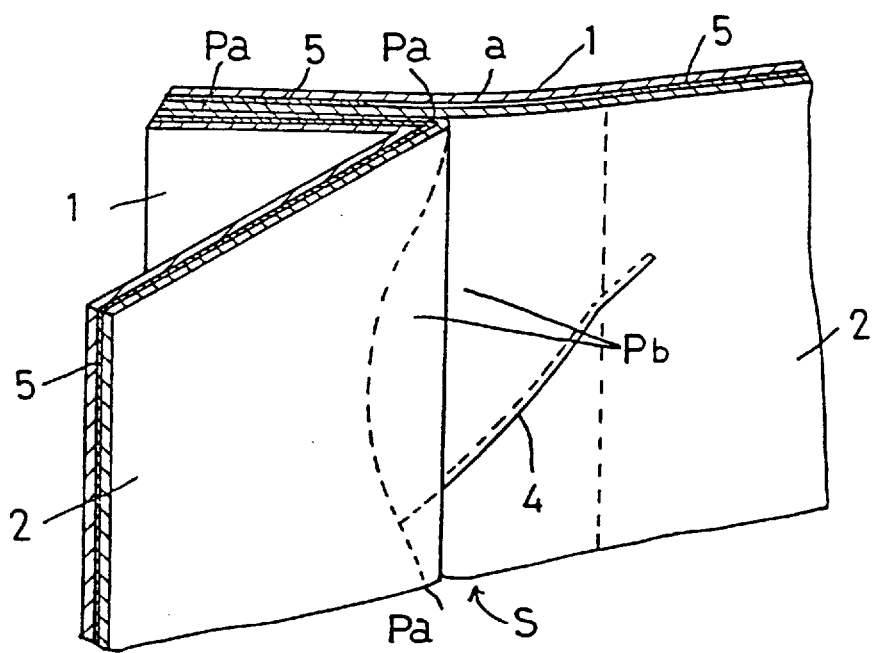
FIG. 17 is a perspective view showing a normal fluid-tight condition of the communicating passage of the wrapping bag at the portion corresponding to the valley portion of the corrugated heat-fused portion.
Figure 18:
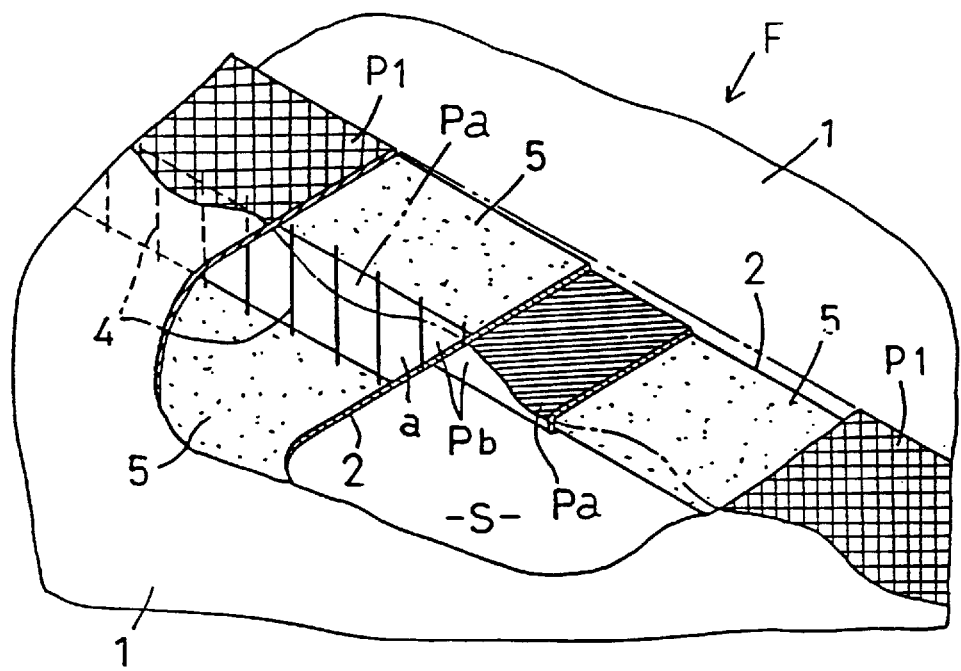
FIG. 18 is a perspective view showing the corrugated heat-fused portion of the wrapping bag with the portion being cut away in a form of stairway.

Then, as illustrated in FIG. 13 as well as in FIGS. 14–20, of the portion of the base film 2 facing the bag inner space S, a portion thereof adjacent the communicating openings 4 and a further portion thereof opposing said portion across the inner space S are sealed together by heat-fusing (a portion denoted by a reference mark Pa in the drawing).

In the above, said portion adjacent the communicating openings 4 refers to such portion where deformation occurs in the periphery of the heat-fused portion, and this portion is located within such an area as to allow the communicating openings 4 to break open at least partially. That is, in heat-fusing the first fusing portion P1 of the wrapping bag, of the sides of this heat-fused portion Pa, the one side facing the bag inner space S is formed to obtain a corrugation traversing the communicating openings 4. The length of each communicating opening 4 is set to be slightly greater than the width of the communicating passage 3.

With the above, the communicating passage 3 is provided by the non-bonded portion (a) formed between the nylon base film 1 and the polyethylene base film 2 which are not heat-fusible to each other. Thus, even if the peripheral portions of the wrapping bag are heat-fused in the direction traversing the non-bonded portion (a), there occurs no blockage of the communicating passage 3 provided by the non-bonded portion (a). Therefore, regardless of the forming position of the non-bonded portion (a), the desired communicating passage 3 may be provided reliably. Hence, this communicating passage may be provided at any desired position according to the particular shape of the wrapping bag.

With the formations of the non-bonded portion (a) for providing the communicating passage 3 and of the communicating openings 4 alone, when the inner pressure of the bag builds up due to such external factor as the ambient temperature or external pressure, the non-bonded portion (a) and the peripheral edges of the communicating openings 4 would be attached to the outer nylon base film 1, thus failing to provide the discharging effect.

However, according to the present invention, as described above, since the film portion adjacent the peripheral edges of the communicating openings 4 and the further film portion opposing thereto are heat-fused to each other, when the inner pressure of the bag builds up, the area around the heat-fused portion is expanded, thereby to break open the many communicating openings 4, so that the fluid in the bag inner space S may be smoothly discharged to the outside.

On the other hand, under a normal condition when the inner pressure of the wrapping bag is lower than a predetermined level (below the atmospheric pressure), the many openings 4 and the non-bonded portion (a) forming the communicating passage 3 are maintained under the sealed contact condition, so that the inside of the bag may be maintained at the high fluid-tight condition.

(Second Embodiment Relating to a Wrapping Bag)

Figure 19:
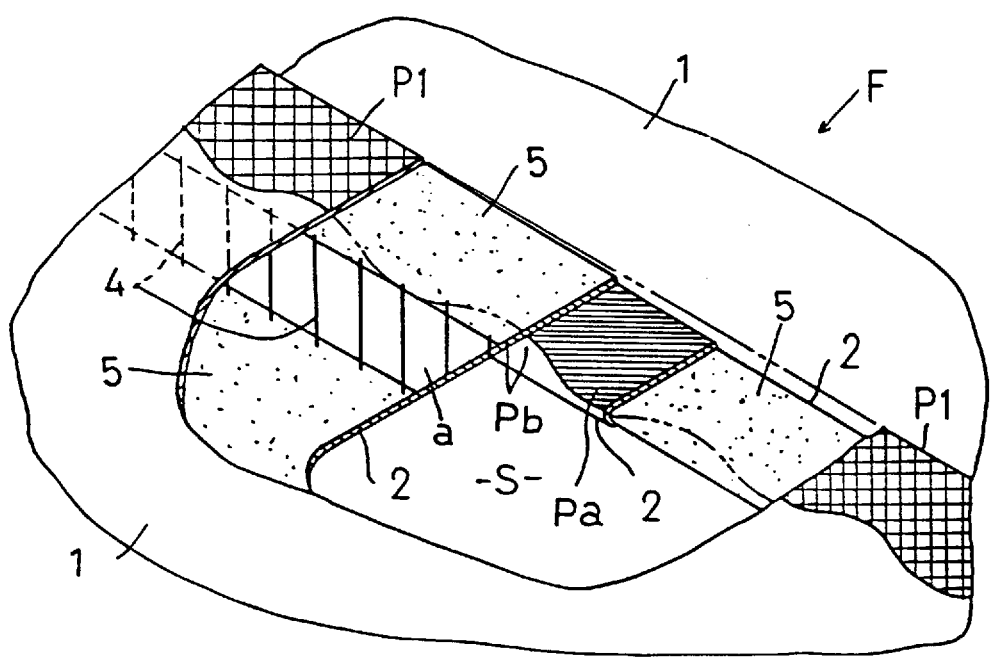
FIG. 19 is a perspective view showing the corrugated heat-fused portion of the wrapping bag with the portion being cut away in a form of stairway.

In the foregoing first embodiment, the first fusing portion P1 is heat-fused into such corrugated shape that its side facing the bag inner space S extends towards the communicating openings 4. Instead, as shown in FIG. 19, this first fusing portion P1 of the wrapping bag may be heat-fused into such corrugated shape that the width of this portion P1 is partially constricted.

In the case of this embodiment, when the wrapping bag is sealed by using the conventional heat sealing machine, additional process is needed only for cutting off the width of the sealed portion in the form of corrugation. Thus, this embodiment provides an advantage in terms of the system installation.

(Third Embodiment Relating to a Wrapping Bag)

Figure 20:
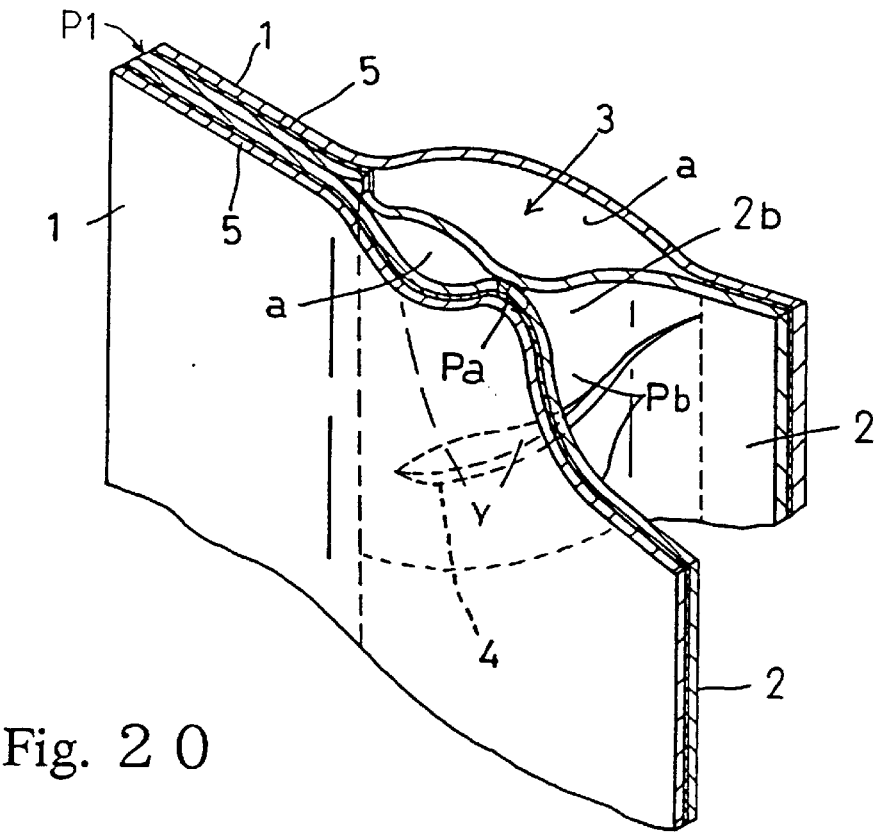
FIG. 20 is a perspective view showing the discharging condition of the communicating passage of the wrapping bag.

In the foregoing embodiment, the two polyethylene base films 2 facing the bag inner space S are simply pressed and heat-fused to each other along the thickness of the same. An alternate construction is conceivable as illustrated in FIG. 20. In this, a film portion 2b adjacent the peripheral edges of the communicating opening 4 projects cantilever-wise and a portion of this cantilever-like film portion 2b is heat-fused to the film portion opposing thereto across a portion of the bag inner space S.

(Fourth Embodiment Relating to a Wrapping Bag)

Figure 21:
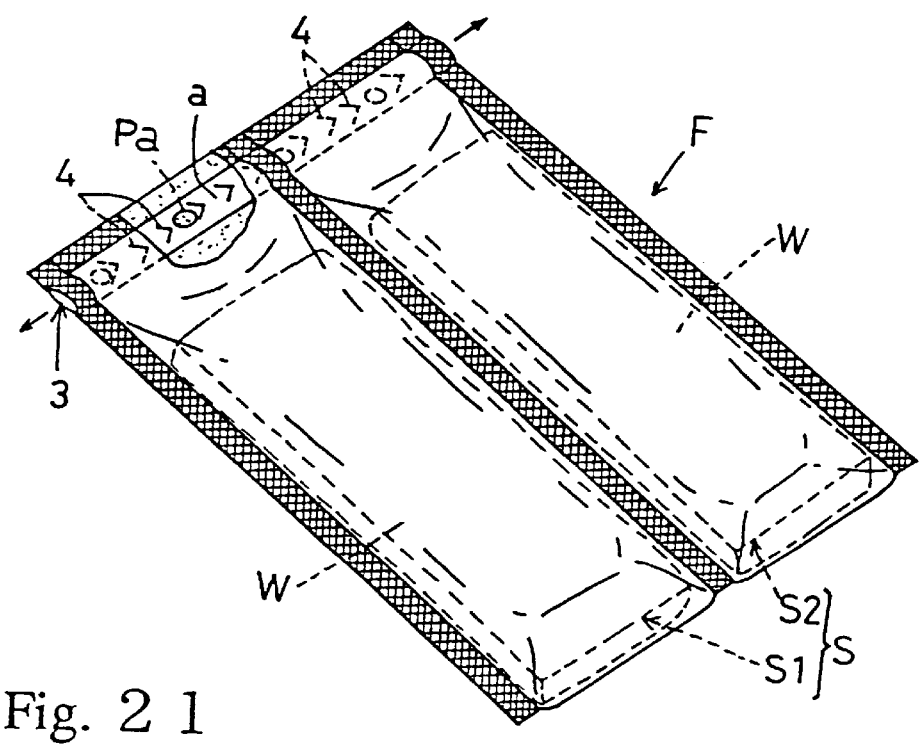
FIG. 21 is a partially cutaway perspective view of a double-sealed type wrapping bag.
Figure 2:
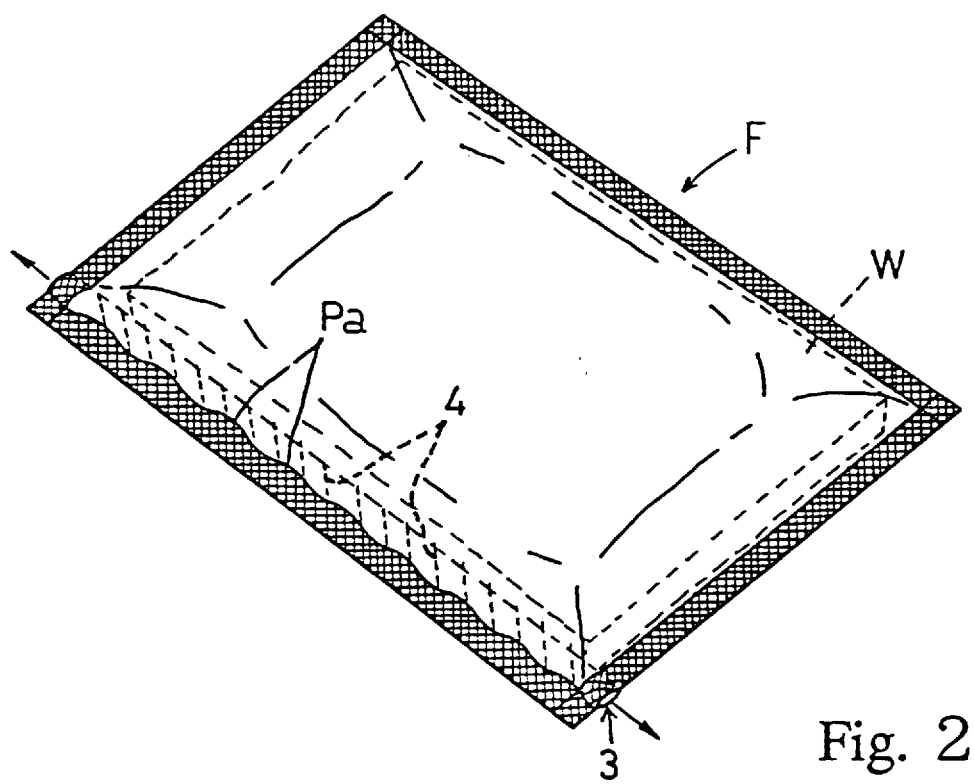
Figure 2:
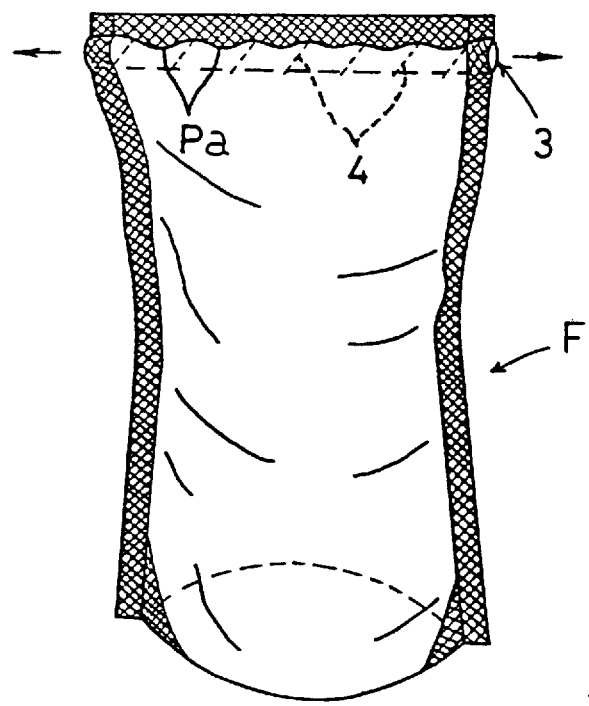

FIG. 21 shows a double-sealed type wrapping bag having its inner bag space S sectioned into two separate inner compartments S1, S2. The non-bonded portion (a) is formed so as to provide a single communicating passage 3 traversing the two inner compartments S1, S2 and communicating with the outside of the bag. The synthetic resin layer 2 on the side of the compartments S1, S2 and corresponding to the non-bonded portion (a) defines a plurality of V-shaped communicating openings 4 for communicating between the communicating passage 3 and the separate inner compartments S1, S2. Further, of the innermost synthetic resin layer 2 facing the inner compartments S1, S2, portions thereof adjacent the peripheral edges of the communicating openings 4, i.e. the portions located between the adjacent pair of communicating openings 4 and further portions thereof opposing thereto across portions of the inner compartments S1, S2 are heat-fused in the form of fused spots.

When the bag inner space S is sectioned into the separate inner compartments S1, S2, it is not absolutely necessary to form the single communicating passage 3 as described in this fourth embodiment. Instead, communicating passages 3 may be provided for the respective communications with the separate inner compartments S1, S2.

Figure 24:
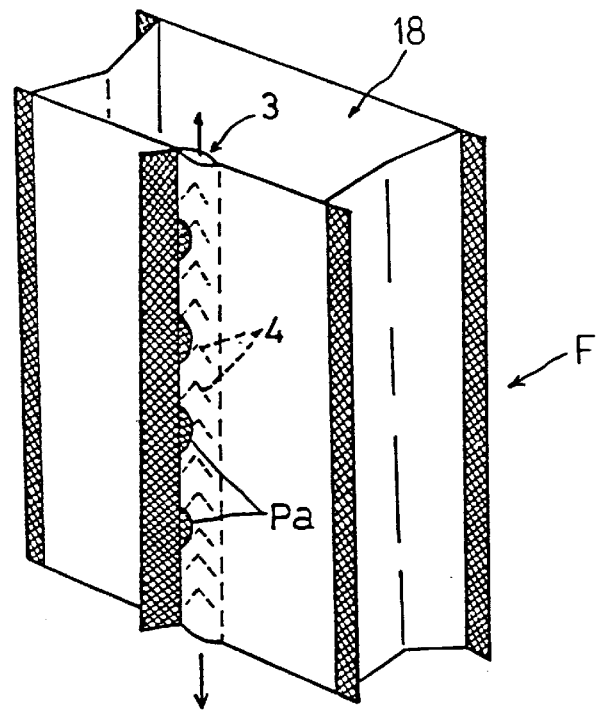
FIG. 24 is a perspective view of a four-side gusset-sealed type wrapping bag.

Incidentally, in the foregoing embodiments, the wrapping bags comprise the four-saide gusset-sealed type. Instead, the present invention may be applied to a variety of types of wrapping bags such as a three-side-sealed type bag shown in FIG. 23 or a four-side-sealed type shown in FIG. 24. Further, although the communicating openings 4 are provided as cuts in the foregoing discussion, the same may be provided as slit-like through holes, circular through holes or the like.

(Fifth Embodiment Relating to a Wrapping Bag)

Figure 25:
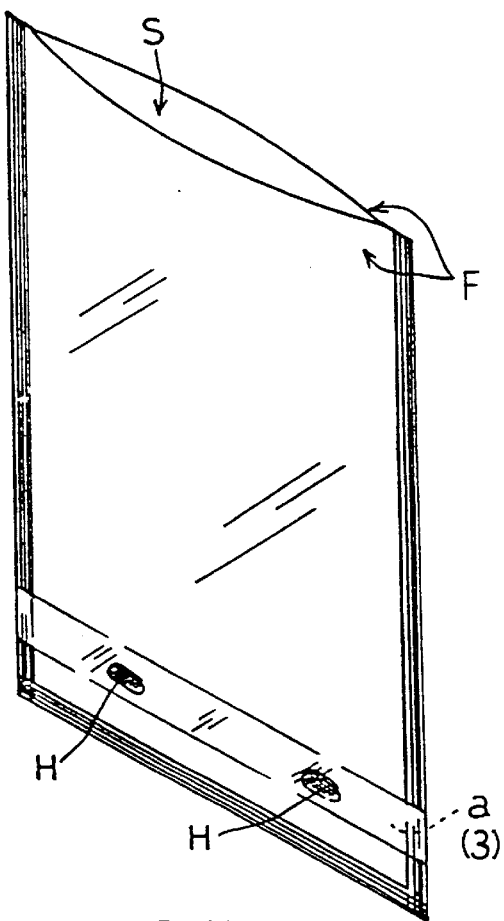
FIG. 25 is a perspective view showing the wrapping bag before an object is stored therein.
Figure 26:
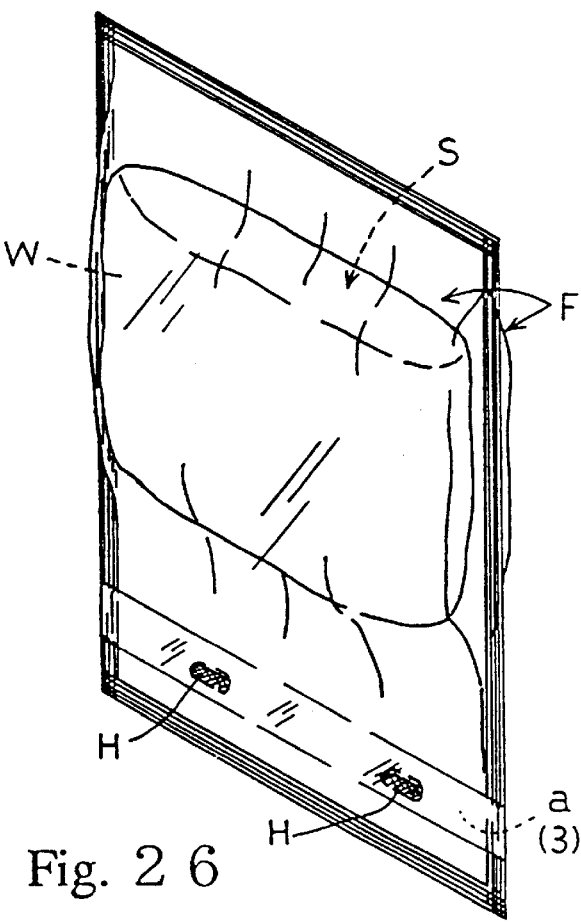
FIG. 26 is a perspective view showing the wrapping bag as storing the object in a sealed condition.

A wrapping bag of this embodiment, as shown in FIGS. 25 and 26, comprises two sheets of the laminate films F with three sides thereof being heat-sealed. In this, as shown in FIG. 27, one laminate film F includes the non-bonded portion (a) while the other film does not have the same.

The disposing position of the band-like non-bonded portion (a) should be a position opposing to the entrance opening of this bag and displaced towards the side edge of the same. And, this non-bonded portion (a) extends between the opposing pair of side edges of the bag.

Incidentally, in heat fusing the side edges of the two laminate films F in the form of sheets, the nylon base film 1 and the polyethylene base film 2 too are placed into mutual contact and then pressed and heated under this condition. Yet, since these films can not be heat-fused to each other, no bonding occurs at the non-bonded portion (a).

Then, the two sheets of laminate films F are compressed and heated together at the opposed sides across the non-bonded portion (a). With this, the two polyethylene base films 2 opposing to each other across the bag inner space S are partially heat-fused together, thereby to form a heat-fused spot H. In this case too, no heat fusion occurs between the nylon base film 1 and the polyethylene base film 2. This heat-fused spot H has e.g. an oval shape. Preferably, two heat-fused spots H are to be formed. After this, as illustrated in FIG. 26, an wrapping object W such as a food product will be inserted into the bag inner space S and then the opened side edge is heat-fused to seal the inner space S.

Next, functions of the above wrapping bags will be described with reference to FIGS. 27 through 30. As illustrated in FIGS. 27 and 28, when the inner pressure of the bag inner space S increases, the laminate film F will be inflated, thereby to generate a force tending to separate the heat-fused spot H. The strength of the peripheral edge portion around this heat-fused spot H has decreased, due to the thermal effect of the heat fusion, to be lower than that of the adjacent polyethylene base film 2. Thus, when the separating force becomes overwhelming, the polyethylene base film 2 at the peripheral edge of the heat-fused spot H breaks open, so that generated vapor in the inner space S will be discharged from this broken opening portion Fh through the non-bonded portion (a) whereby the inner pressure of the inner space S drops.

With the break-opening of the polyethylene base film 2, the vapor present in the bag inner space S is instantaneously discharged to the outside of the bag, whereby the inner pressure of the space S decreases. In this condition, since the bag still maintains its expansion, the base film 1 and the base film 2 forming the non-bonded portion (a) are apt to stick to each other thereby to block the communicating passage 3. However, since the polyethylene base film 2 has flexibility, the peripheral edge of the broken opening portion Fh is maintained at the condition projecting towards the inner space S. That is, the peripheral edge of the broken opening portion Fh is maintained detached from the nylon base film 1. For this reason, even if the inner pressure of the bag inner space S builds up again, the generated vapor or the like present in the space S may enter the communicating passage S through the detached area, thus detaching the mutually attached base film 1 and the base film 2 to be discharged to the outside of the bag.

Incidentally, the shape of the heat-fused spot H is not limited to the oval shape discussed above. This may be formed circular, rectangular, cross-shaped, or band-like. Further, the position and number of the heat-fusing spot may also be conveniently varied.

In forming the heat-fused spot(s) H, the two laminate films F may be displaced relative to each other along the faces thereof. In this case, a predetermined bag inner space S is formed before introduction of the object. With this, a greater separating force will be applied to the heat-fused polyethylene base films 2, so that break opening of these polyethylene films 2 will take place more easily.

It is not absolutely necessary for the entire heat-fused spot H to break open for separating the polyethylene base films 2 from each other. Substantially the same effect may be achieved even if only a part of its peripheral edge breaks open.

Further, in the foregoing, the non-bonded portion (a) is provided only to one of the laminate films F. Instead, as shown in FIG. 31, the non-bonded portions (a) may be provided to both of the laminate films 1, 2, with these non-bonded portions (a) being overlapped with each other in the face symmetrical fashion.

Further, instead of forming the wrapping bag by overlapping two sheet members, the bag may be formed by folding a single sheet or by using a cylindrical member.

(First Embodiment Relating to a Wrapping Container)

Figure 32:
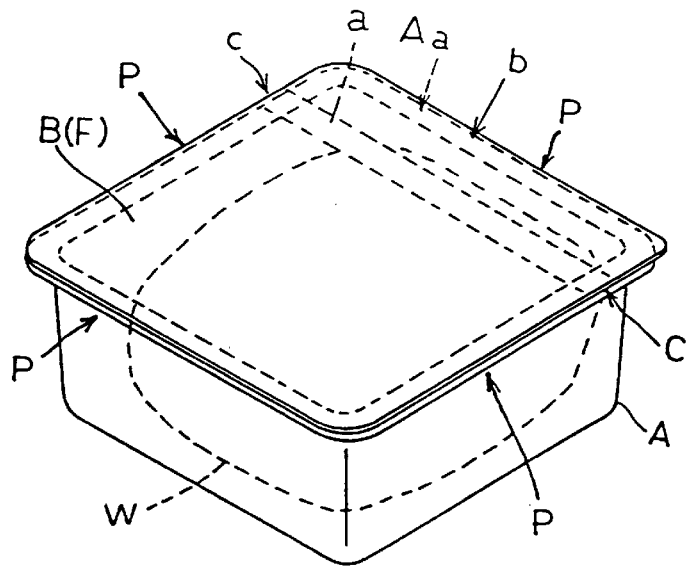
FIG. 32 is a perspective view showing the wrapping bag after wrapping an object therein.

The laminate film F relating to the present invention may be employed as a cover member B for a wrapping container, as shown in FIG. 32. This wrapping container may be used for heat cooking in e.g. a microwave oven, with the food product object W being maintained seal-wrapped therein. Specifically, the laminate film F cut into a predetermined size is undetachably (with a predetermined force) heat-sealed to an upper opening peripheral portion Aa of a polyethylene container body A having heat-resistant and form-retaining properties.

The cover member B is cut into a predetermined size with bonded portions being present on the width-wise sides across the non-bonded portion (a). After the object W is introduced and stored in the container body A, a peripheral edge portion (b) of the polyethylene base film 2 of the cover member B is laid over the opening peripheral edge portion Aa of the container body, in such a manner that the non-bonded portion (a) may extend transverse a portion of the opening peripheral edge portion Aa of the container body A. Then, a pressing and heating operation is effected from the front face of the peripheral edge portion of the nylon base film 1 of the cover member B by using e.g. an unillustrated sealing bar. With this, the base film 2 facing the container inner space S of he cover member B is heat-fused onto the opening peripheral edge portion Aa of the container body A (the portion denoted with a mark P in the drawings).

The communication openings 4 of the base film 2 laid over the opening peripheral edge portion Aa of the container body A is sealed through this opening peripheral edge portion Aa as the base film 2 is heat-fused to this peripheral edge portion Aa. However, since the non-bonded portion (a) between the two base films 1, 2 is non-heat-fusible to each other, no heat fusion or sealing of the non-bonded portion (a) occurs by the heat pressing of the cover member B to the container body A. Thus, the non-bonded portion (a) and the communicating openings 4 on the side of the container inner space S together provide the communicating passage 3 communicating between the container inner space S and the outside of the container, and also the opening portion C may be maintained.

Figure 33:
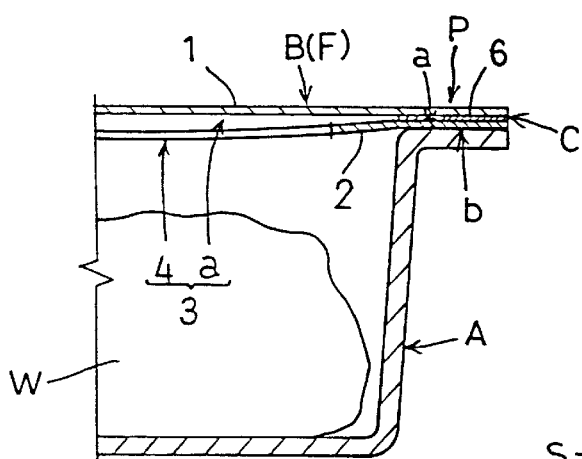
FIG. 33 is a section view showing a wrapping container at its fluid-tight condition.
Figure 34:
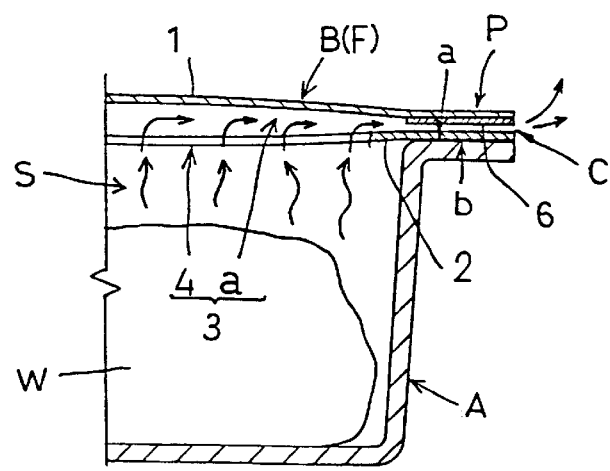
FIG. 34 is a section view showing the wrapping container at its discharging condition.

As shown in FIGS. 33 and 34, the outlet opening C is adhered with such an adhesive force which allows break-opening of the same when the inner pressure reaches a predetermined level. Therefore, when the inner pressure of the container inner space S increases, no breakage at the heat-fused portion between the opening peripheral edge portion Aa of the container body and the cover member B will occur, or the cover member B or the container body A per se will not burst. Rather, when the inner pressure of the container inner space S increases above the predetermined level, the fluid present in the container inner space S flows at this outlet opening C between the two base films 1 and 2, and this fluid extends and separate the base films 1, 2 from each other and consequently opens up the same.

Accordingly, when the wrapping container of the present invention with the object such as a food product being sealed therein is heat-cooked in a microwave oven, water vapor or the like generated from the product will not break the cover member B or the container body A.

Further, in the course of shipping or displaying of this container, an external force may be applied to the laminate film F of this outlet opening C due to e.g. engagement with another member, thereby to tend to break open this outlet opening C. However, the films 1, 2 forming this outlet opening C are very thin and may readily adhere to each other. Moreover, of these base films 1, 2 forming the non-bonded portion (a), the portions thereof corresponding to the border between the opening peripheral edge portion Aa of the container inner space S are maintained at the mutually adhered state by the heat fusion between the opening peripheral edge portion Aa of the container body A and the laminate film F and also by the presence of the bonded portions which are continuously present along the opposed sides of the width direction of the communicating passage 3. Therefore, when the inner pressure of the container A and the ambient pressure are the same, the communicating passage 3 may be maintained at highly fluid-tight condition.

In the above embodiment, the opening of the communicating openings 4 and the resultant communication between the container inner space S and the non-bonded portion (a) are realized as the cutting portions of the communicating openings 4 downwardly deform by their own weight. In the course of shipping or displaying or the like, the cutting portions of the communicating openings 4 may not downwardly deform, so that these openings 4 may remain closed by the mutual abutment of the cutting end faces of these communicating openings 4. However, during a heat cooking operation, the portions adjacent the cutting end faces of the communicating openings 4 will be deformed in the form of irregular corrugation by the rise of humidity or temperature inside the container, due to the properties of the polyethylene base film 2. Hence, the cutting portions of the communicating openings 4 will break open reliably thereby to communicate between the container inner space S and the non-bonded portion (a).

(Second Embodiment Relating to a Wrapping Container)

The non-bonded portion (a) need not extend over the two opposing peripheral edge portions of the peripheral portion Aa of the container body A. With the method as illustrated in FIG. 10, a short communicating opening 4 may be provided to extend from one side end of the laminate film F to the width-wise center. Then, this laminate film F is cut into a predetermined size and then heat-fused to the peripheral edge portion Aa of the container body A, thereby to obtain such cover member B that the outlet opening C is formed at one location at the peripheral edge of the cover member B and the non-bonded portion (a) extend from this opening portion C to the center of the cover member B.

Incidentally, in the above embodiments relating to a wrapping container, the communicating openings 4 are provided in the form of cuts. Instead, the same may be provided in the form of slit-like through holes, circular through holes or the like.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A wrapping bag comprising a pair of laminates having peripheral edges which are heat fused together to form an inner space of said bag, each laminate comprising an inner layer and an outer layer which are bonded together by bonding means, said inner layers being in mutually facing relationship, a communicating passage formed between said inner layer and said outer layer of one of said laminates where said bonding means is interrupted, and a heat fused spot formed by partially heat fusing said inner layers together across said inner space, said heat fused spot being located where said bonding means is interrupted, whereby, when pressure of said inner space builds up, said heat fused spot becomes separated to break open one of said inner layers and consequently to communicate said inner space and said communicating passage with each other.

2. A wrapping bag as claimed in claim 1, wherein said heat fused spot is displaced toward an edge of said wrapping bag opposite to an entrance opening for said wrapping bag.

* * * * *

UNITED STATES PATENT AND TRADEMARK OFFICE
CERTIFICATE OF CORRECTION

PATENT NO : 5,839,832
DATED : November 24, 1998
INVENTOR(S): Junichi Hagino

It is certified that error appears in the above-identified patent and that said Letters Patent is hereby corrected as shown below:

In column 1, line 3, change "5,644,847" to --5,655,842--.

In column 2, line 41, after "provided" delete "to".

In column 2, line 42, before "aperture" insert --the--.

In column 2, line 46, change "trasversing" to --traversing".

In column 2, line 59, before "outside" delete "interior".

In column 8, line 47, change "four-saide" to --four-side--.

In column 10, line 32, change "he" to --the--.

In column 10, line 61, change "separate" to --separates--.

Signed and Sealed this

Thirteenth Day of July, 1999

Attest:

Q. TODD DICKINSON

Attesting Officer

Acting Commissioner of Patents and Trademarks